US007082116B2

(12) United States Patent
Reza et al.

(10) Patent No.: US 7,082,116 B2
(45) Date of Patent: Jul. 25, 2006

(54) METHODS AND SYSTEMS IMPLEMENTING MOBILITY SUPPORT IN A PACKET-BASED WIRELESS ACCESS NETWORK

(75) Inventors: Ahmed Areef Reza, Ottawa (CA); Hongyi Li, Ottawa (CA); Syed Kamran Raza, Ottawa (CA)

(73) Assignee: Nortel Networks Limited, Montreal (CA)

( * ) Notice: Subject to any disclaimer, the term of this patent is extended or adjusted under 35 U.S.C. 154(b) by 1097 days.

(21) Appl. No.: 09/749,423

(22) Filed: Dec. 28, 2000

(65) Prior Publication Data

US 2002/0085528 A1 Jul. 4, 2002

(51) Int. Cl.
*H04Q 7/24* (2006.01)
*H04L 12/56* (2006.01)

(52) U.S. Cl. .................. 370/338; 370/401; 455/435.1; 455/436; 719/315; 719/317

(58) Field of Classification Search ............... 370/310, 370/328, 338, 331, 349, 389, 392, 395.5, 370/395.52, 400, 401, 466, 469, 471, 474, 370/475; 455/433, 435.1, 436; 719/313, 719/315, 316, 317
See application file for complete search history.

(56) References Cited

U.S. PATENT DOCUMENTS

| 5,737,607 | A | * | 4/1998 | Hamilton et al. ............ 719/316 |
| 5,825,759 | A | * | 10/1998 | Liu ............................ 370/331 |
| 6,085,222 | A | * | 7/2000 | Fujino et al. ................ 709/202 |
| 6,192,250 | B1 | * | 2/2001 | Buskens et al. ............. 455/463 |
| 6,256,300 | B1 | * | 7/2001 | Ahmed et al. ............... 370/331 |
| 6,452,920 | B1 | * | 9/2002 | Comstock ..................... 370/349 |
| 6,487,406 | B1 | * | 11/2002 | Chang et al. ............. 455/422.1 |
| 6,522,880 | B1 | * | 2/2003 | Verma et al. ................ 455/436 |
| 6,654,359 | B1 | * | 11/2003 | La Porta et al. ............. 370/328 |
| 6,747,961 | B1 | * | 6/2004 | Ahmed et al. ............... 370/328 |
| 2001/0054065 | A1 | * | 12/2001 | Garg .......................... 709/203 |
| 2002/0026527 | A1 | * | 2/2002 | Das et al. .................... 709/245 |
| 2004/0024901 | A1 | * | 2/2004 | Agrawal et al. ............. 709/238 |

* cited by examiner

*Primary Examiner*—Hassan Kizou
*Assistant Examiner*—Saba Tsegaye

(57) ABSTRACT

An object-based framework for a wireless access network is provided. Several applications of the proposed framework to enable multicasting and RSVP in the wireless access network are also provided. The object-based framework solves the problem of micro-mobility, in which a mobile host can maintain active TCP sessions during handoff. The location transparency and object serialization functions of distributed object technology are used to solve IP mobility issues. A network node adapted to forward a data packet, such as an IP packet, to a mobile host connected to a radio node by performing a remote method invocation with the data packet as an argument

49 Claims, 7 Drawing Sheets

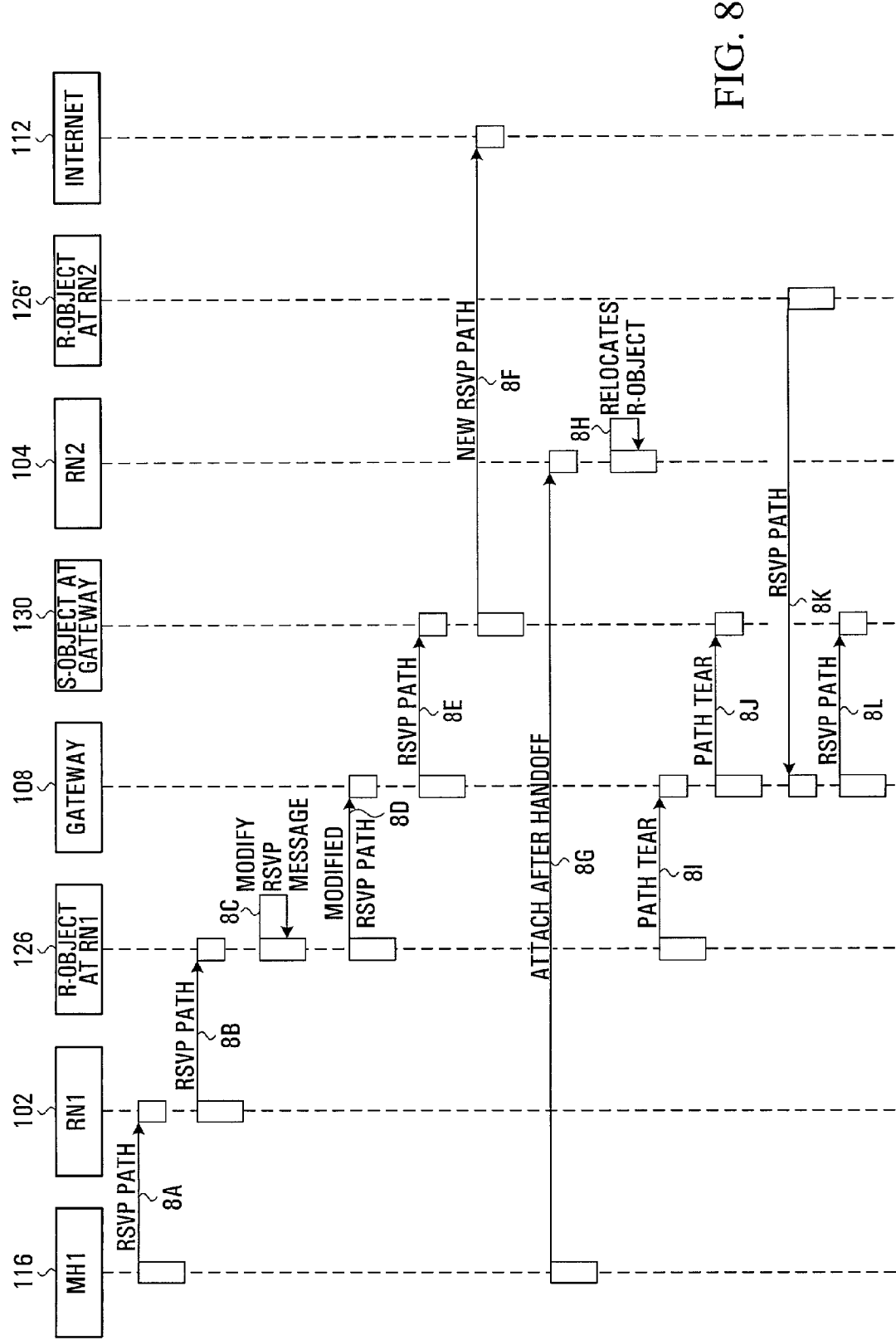

METHODS AND SYSTEMS IMPLEMENTING MOBILITY SUPPORT IN A PACKET-BASED WIRELESS ACCESS NETWORK

FIELD OF THE INVENTION

This invention relates to mobility within a wireless access network and, more particularly, to a method of implementing mobility support in a packet-based wireless access network.

BACKGROUND OF THE INVENTION

The Internet Protocol was originally developed with the assumption that users, each of which is assigned a unique Internet address, would be connected to the network at fixed locations. However, with the rapid acceptance of portable and handheld devices amongst consumers, the movement or migration of users about an individual network is typically the norm rather than the exception. The implicit design assumptions of the Internet Protocol are violated by this type of usage.

Radio access networks provide one of the most important network access technologies to extend the reach of the Internet to the mobile population, allowing mobile hosts to communicate with others at anytime, anywhere. Over the years, various mobility models have been proposed to support both wide-area macro-mobility and local-area micro-mobility, with an emphasis on primarily mobile-to-fixed and fixed-to-mobile network communication. These include for example Cellular IP, HAWAII, Mobile IPv4 and Mobile IPv6. These solutions, however, do not provide optimal routing paths for mobile-to-mobile communications because of the common requirement of routing IP packets through an anchor point in the network. However, as small and portable network devices rapidly penetrate the market, optimized mobile-to-mobile communication in metropolitan areas (e.g. Ottawa, Toronto) is crucial for the next generation of wireless Internet applications.

Typically, location information of a host is encoded in an Internet address (i.e. IP address). Therefore, in conventional systems, a mobile host must be located on the network at the location indicated by its IP address in order to receive IP packets. In such systems, a mobile host may need to change its IP address whenever it changes its point of access to the network for it to not lose its ability to communicate. Likewise, if a mobile host moves from one network to another, convention dictates that its IP address must also change.

Mobile IP attempts to deal with this issue, but suffers from triangular routing as a home agent is used as an anchor point. All downstream traffic for a mobile host always goes through the mobile's home agent. Mobile IP does not, therefore, guarantee an optimal routing path for mobile-to-mobile communications.

General Packet Radio Services (GPRS) provides data services in GSM networks. In GPRS, each mobile host is anchored with a GGSN and all packets from a mobile host always go through the same GGSN. As a result, the mobile-to-mobile routing path may not be optimal. GPRS uses GTP, a proprietary tunneling protocol between SGSN and GGSN. As a result, there is no provision for IP multicast in GPRS.

A solution is needed, therefore, whereby a mobile host does not lose any of its sessions due to a handoff. Specifically, some sort of mechanism is required to ensure that packets addressed to moving hosts can be successfully delivered with high probability.

SUMMARY OF THE INVENTION

The present invention proposes an object-based framework for a wireless access network. Several applications of the proposed framework to enable multicasting and RSVP in the wireless access network are also presented.

The object-based framework solves the problem of micro-mobility, in which a mobile host can maintain active TCP sessions during handoff. The location transparency and object serialization functions of distributed object technology are used to solve IP mobility issues.

One broad aspect of the invention provides a network node adapted to forward a data packet, such as an IP packet, to a mobile host connected to a radio node by performing a remote method invocation with the data packet as an argument.

The network node has an input for receiving data packets from an external host having a destination address belonging to the mobile host. A stationary object is defined which is associated with the external host belonging to a distributed object framework, the stationary object maintaining an association between the destination address of the mobile host and an object reference for a relocatable object associated with the mobile host. Performing a remote method invocation with the data packet as an argument then involves performing a remote method invocation through the distributed object framework of a method in the relocatable object associated with the mobile host.

A packet filter may be provided to identify data packets having the destination address belonging to the mobile host and to send them to the stationary object associated with the external host.

In some embodiments, the network node is adapted to communicate with multiple external hosts. The network node comprises a number of stationary objects, one for each of the multiple external hosts. Each stationary object has a raw socket interface for receiving and sending packets. The packet filter is adapted to identify data packets having any one of a number destination addresses and to send each to a particular stationary object responsible for the particular external host from which the packet was received. Each stationary object maintains a mapping between each of destination addresses the stationary object is responsible for and a corresponding object reference of a relocatable object associated with one of a plurality of mobile hosts. Each stationary object upon receiving a data packet having a destination address through its raw socket interface performs a remote method invocation of a method of the relocatable object associated with destination address.

In one embodiment, the network node is a gateway node of a radio access network, the gateway node having a backbone connection to another network which is connected to external networks through backbone connections. Packets destined for the external network are forwarded using next-hop routing.

In the event multiple external hosts are involved, the network node is further adapted to cause to be generated a stationary object in respect of each external hosts with which the network node is in communication.

In some embodiments, the distributed object framework is an object request broker, such as CORBA, DCOM or JAVA RMI for example.

In some embodiments, the network node is further adapted to forward all multicast packets to a multicast server, or is made RSVP aware, and is adapted to establish RSVP sessions over the network.

Another broad aspect of the invention provides a radio access node adapted to provide data packet service to a mobile host in wireless communication with the radio access node. The radio access node has a relocatable object associated with the mobile host belonging to a distributed object framework, the relocatable object having a remotely invokable receive data packet method. The radio access node is adapted to receive a data packet from another network node by having the receive data packet method remotely invoked with the data packet as an argument, and is adapted to forward the packet to the mobile host.

The radio access node has an input for receiving data packets from the mobile host, the data packets having a destination address external to the network. Upon receipt of a data packet from the mobile host having a destination address external to the network, the radio access node is adapted to forward the data packet using next-hop forwarding.

The relocatable object may have a raw socket interface through which to receive packets from the mobile host which are then forwarded by the relocatable object using next-hop forwarding.

The relocatable object can be moved to a different radio access node in the event the mobile host performs a handoff to the different radio access node.

Upon initial connection with the mobile host, the radio node is adapted to search locally for the relocatable object in association with the mobile host, and if not found locally, to request through the distributed object framework that the relocatable object be provided from a different radio access node if in existence, and if the relocatable object is not in existence to generate a new relocatable object for the mobile host.

The relocatable objects also facilitate mobile-to-mobile communications. Data within or associated with the relocatable object maintains an association between a destination address of a different mobile host and an object reference for another relocatable object associated with the different mobile host. The radio access node is adapted to receive packets from the mobile host having a destination address belonging to the different mobile host and to forward the packet to the different mobile host by performing a remote method invocation with the data packet as an argument of a method in the another relocatable object associated with the mobile host.

In another embodiment, the relocatable object is adapted to behave as a proxy for the mobile host for multicast-like communications. For example, the relocatable object intercepts multicast join messages, modifies them to specify a location of the relocatable object rather than the address of the mobile host, before forwarding them, and then the relocatable object receives multicast traffic on behalf of the mobile host and forwards the multicast traffic to the mobile host. Upon the relocatable object's relocation at a different access node, the relocatable object is adapted to leave the multicast group, and then rejoin from its new location, all transparently to the mobile host.

In another embodiment, the relocatable object is adapted to behave as a proxy for the mobile host for RSVP-like communications. The relocatable object intercepts RSVP-like messages, modifies them to specify a location of the relocatable object rather than the address of the mobile host, before forwarding them, and then the relocatable object receives RSVP traffic on behalf of the mobile host and forwards the RSVP traffic to the mobile host. Upon the relocatable object's relocation at a different access node, the relocatable object is adapted to tear down an existing RSVP-like connection, and establish a new RSVP-like connection from its new location, all transparently to the mobile host.

Another broad aspect of the invention provides a method for a network node to forward a data packet to mobile hosts. The method involves maintaining a respective stationary object associated with each of a plurality of external hosts, the stationary objects belonging to a distributed object framework, each stationary object maintaining an association between a respective destination addresses of each mobile host with which the associated external host is in communication, and an object reference of a relocatable object associated with each such mobile host. Data packets are received from a particular external host having a destination address belonging to a particular mobile host and passed to the stationary object associated with the particular external host. The stationary object associated with the particular external host performs a remote method invocation with the data packet as an argument through the distributed object framework of a method in the relocatable object associated with the particular mobile host.

Another broad aspect of the invention provides a method for a radio access node to provide data packet service to a mobile host in wireless communication with the radio access node. The method involves defining a relocatable object associated with the mobile host belonging to a distributed object framework, the relocatable object having a remotely invokable receive data packet method. The relocatable object receives a data packet from another network node by having the receive data packet method remotely invoked with the data packet as an argument. The relocatable object forwards the data packet to the mobile host.

Computer readable media having software thereon for causing processing hardware to implement any of the methods disclosed herein are also provided by the invention, as are generic processing platforms running such software, or specifically designed processing hardware such as ASICs which are particularly adapted to implement these methods.

BRIEF DESCRIPTION OF THE DRAWINGS

FIG. 8 is a flow control diagram depicting the flow of control when a mobile host performs a handoff between radio nodes during an active RSVP session with a fixed host using the network of FIG. 1.

DESCRIPTION OF THE PREFERRED EMBODIMENTS

Figure 1:
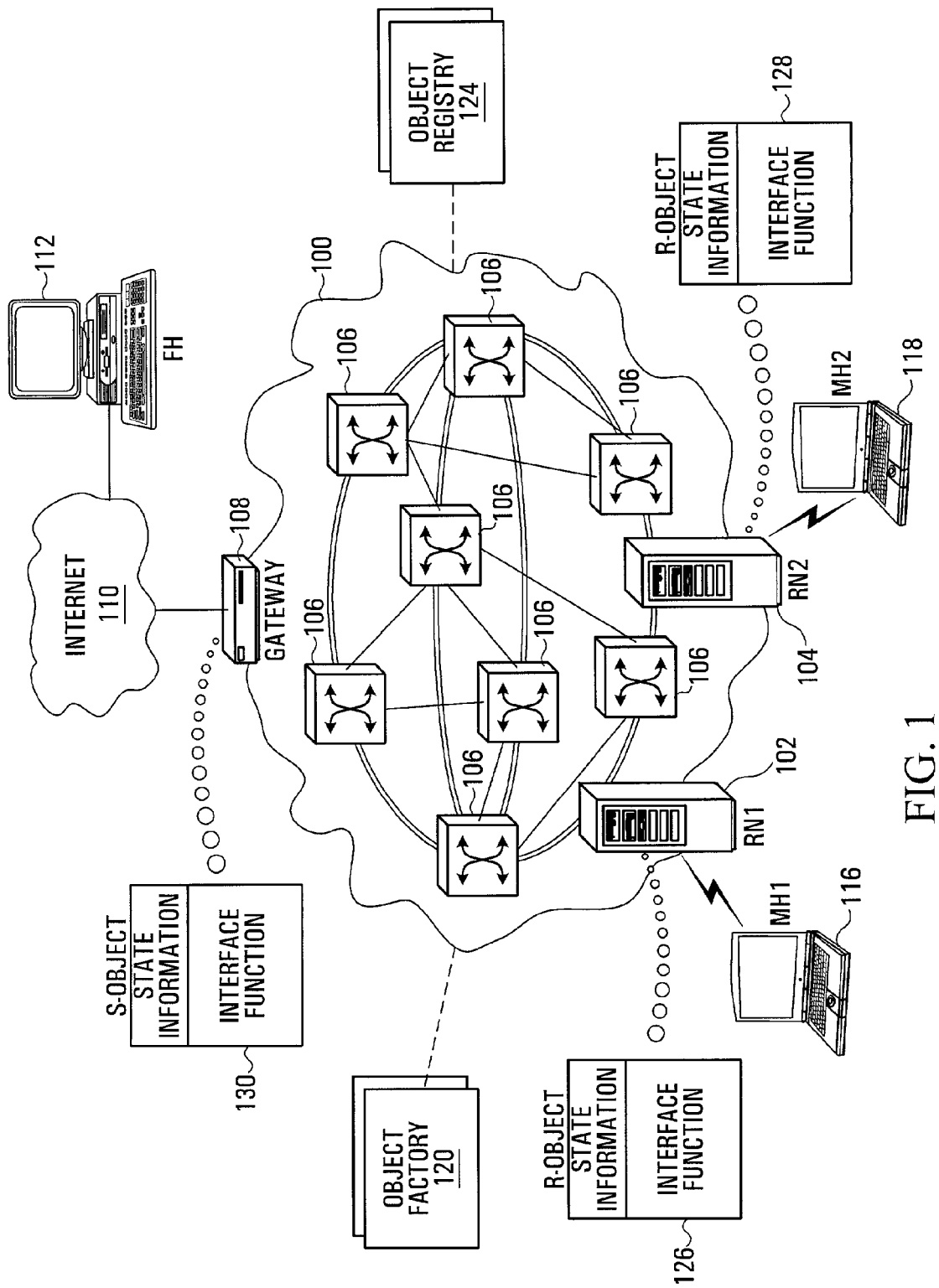
FIG. 1 is a schematic diagram of an all-IP wireless access network based on a distributed object framework in accordance with an embodiment of the present invention.

According to an embodiment of the present invention, each host (fixed or mobile) in a wireless access network is represented with a distributed 'object' and remote method invocation (remote procedure calls) is used to transport data packets which in a preferred embodiment are IP datagrams. While the invention can be applied using other networks types, it is assumed for the purpose of this description that an IP network is employed.

In object oriented systems, an object is an independent software unit. Each object has some properties (or attributes) and some operations (or methods) associated with it. An object exposes its functionalities through its methods. Remote method invocation is a mechanism for delivering messages from one object to another. For example, an external entity (e.g. another object) may invoke one of the methods of the object in order to accomplish a given task. An object, therefore, serves a dual role. It acts as a server when other objects invoke methods on it; it also acts as a client, when it invokes methods on other objects.

In the method of the present invention, the wireless access network is adapted to support a distributed object framework, preferably a distributed object request broker (ORB) architecture. The object framework consists of a set of distributed objects (each representing a host in the network), where each object can be given a name and can also be retrieved using that name.

There are several ORB frameworks available which, in principle, can be used as a building block to implement the required object framework. Examples of possible frameworks include CORBA, DCOM and JAVA RMI (see http://www.omg.org for descriptions of these frameworks. This web set and all documents referred to are hereby incorporated by reference in their entirety). Essentially, each of these frameworks allows a set of interfaces to be defined for each object, the interfaces of a given object defining how the objects can interact. In general, client objects must know these interfaces to communicate with server objects. When a client object invokes a method on a server object, the framework (i.e. DCOM, CORBA or JAVA RMI) handles how to communicate this invocation. The framework marshals the invocation information (i.e. converts the invocation information to such a form which can be transported over the network) and then sends it to the server object. The framework running on the server side captures the marshaled information, unmarshals the message (i.e. converts it from the network-friendly format to a software-friendly format) and then sends it to the appropriate object.

Method invocations implemented through such a framework allow a client object to invoke a method on a server object remotely. The server object cannot differentiate if the client object is far away and actually used an IP network to deliver the message or if the client object is co-located on the same machine. The remote method invocation mechanism is handled by the framework (CORBA, DCOM, JAVA RMI) and not by the objects themselves.

The distributed object framework provides a mechanism for transparently communicating client requests to target object implementations. More particularly, an ORB simplifies distributed programming by decoupling the client from the details of method invocations. This makes client requests appear to be local procedure calls. Specifically, when a client invokes an operation, the ORB is responsible for finding the object implementation, transparently activating it if necessary, delivering the request to the object and returning any response to the caller.

In the framework of the present invention, two special types of distributed objects are defined : 'r-objects' and 's-objects'. An r-object (relocatable object) can be relocated from one location to another. An s-object (stationary object), on the other hand, remains in the same location where it is created. Each r-object and s-object has a respective object reference created by the distributed object framework. When a first object knows the object reference of a second object, it is capable of invoking methods on the second object. When an r-object moves, its reference changes.

In the method of the present invention, one r-object is defined for each mobile host. Each r-object has a raw socket interface through which it can send and receive IP datagrams. A raw socket interface is used to send/receive IP datagrams by a network application or object. The raw socket interface might for example have an IP address and a port number.

It also has an object interface through which other objects can invoke operations on this r-object, which in some embodiments is Interface Definition Language (IDL) (as standardized by OMG (object management group)) specified. Via this object interface, an r-object is capable of receiving IP datagrams from other r-objects or s-objects. In the method of the present invention, the best location to create a particular r-object is at the radio node where its associated mobile host initially attaches.

Furthermore, an r-object can be serialized and relocated from one location to another. Other methods of object relocation may alternatively be employed. Object serialization is a method by which object information is exchanged between two nodes. To serialize an object, the sending node writes a stream of bytes to a data stream, for example between two TCP/IP socket connections. The data stream contains attribute and class information about the object being serialized. The receiving node reads the data stream and is able to reconstruct the corresponding object.

Each r-object keeps track of all the r and s-objects it is in conversation with by maintaining a mapping between object references for these r and s-objects and corresponding destination addresses (IP addresses for IP embodiment). This information is used for binding updates. When an r-object is relocated, it updates the r and s-objects it is in conversation with new binding information which contains its new reference.

An s-object has the same set of interfaces as an r-object. It, too, can send and receive IP datagrams through its raw socket interface. An s-object can also receive IP datagrams through its raw socket interface. It may also send IP datagrams directly to another r-object through the latter's object interface. However, s-objects remain in one location through out their life cycle; they are never relocated to a new location. The best location to create these s-objects is at gateway nodes (access points to other packet networks, such as the Internet).

To further illustrate the role of objects for this invention, consider an s-object. One of its properties is a list of r-object references which define a physical address of each r-object, and an associated destination IP address for each r-object which is understood by the distributed object framework. From an implementation perspective, these r-object references can be implemented as a vector (or array). One of the r-object's operations or methods is a "receive IP packet" method. Another object may invoke this method to pass an IP packet to the r-object. Therefore, when an s-object invokes a method on an r-object, the r-object becomes a server for the client s-object. The roles are reversed for the opposite scenario in which an r-object invokes a method on an s-object.

FIG. 1 depicts an all IP wireless access network (RAN) 100 based on a distributed object framework in accordance with the present invention. The all-IP RAN is a pure packet switched network based on the Internet Protocol (IP). The configuration in FIG. 1 provides access services to coverage areas defined by a first radio node (RN1) 102 and a second radio node (RN2) 104, respectively, although it is to be understood the invention can be applied in the context of any number of radio nodes. RN1 102 and RN2 104 are radio access points that provide wireless access services to mobile hosts within their respective coverage areas. For the purpose of example, a first mobile host (MH1) 116 is shown located in the coverage area of RN1 102 and a second mobile host (MH2) 118 is shown located in the coverage area of RN2 104. RN1 102 and RN2 104 are attached to an infrastructure of cooperative interconnected IP packet routers 106 forming part of the RAN 100. A gateway 108 connects the RAN 100 with one or more networks external to RAN 100, for example a public Internet backbone 110. There may be additional gateways (not shown). For the purpose of example, a fixed host (FH) 112 is shown located outside of the RAN 100 and is connected to the Internet backbone 110 via an access network (not shown). The packet routers 106 interconnect RN1 102, RN2 104 and the gateway 108 to form the infrastructure for data transportation within the radio access network 100.

Connections through the RAN 100 are established and maintained through the use of the above-introduced r-objects and s-objects. The generation and use of these objects will now be described in detail be way of example. When a mobile host, such as mobile host (MHI) 116 attaches with the RAN 100 for the very first time through a radio node within whose coverage area the mobile host is located, for example RN1. The radio node RN1 102 to which MH1 116 attaches begins by causing to be set up an r-object for the mobile host. An object factory 120 might be provided to assist in this, an object factory being a special type of object which can create other objects in conjunction with an object registry 124 which knowledge of objects which have been created and their locations. A name for the r-object is generated which in one embodiment is derived from the IP address of MH1 116. In one embodiment, the IP address of the mobile host is obtained by the mobile host MH1 from the radio access network 100, for example through an exchange of DHCP (dynamic host control protocol) messages. Alternatively, a mobile host might be configured with a fixed IP address. There will be a one-to-one correspondence between MH1's address and the object name. For example, if the IP address of MH1 is of the form 47.159.195.1 the corresponding object name could be of the from r.47_159_195_1. The object factory 120 before creating a new object attempts to use the object registry 124 to locate the r-object. Since MH1 116 is attaching to the network for the very first time, its r-object does not exist and the object registry 124 will not find it. The object factory 120 subsequently creates an r-object 126 corresponding to MH1 116 and registers it with the object registry 124. The radio node RN1 initializes the r-object by setting up an divert mechanism which diverts all IP packets received from MH116 to the raw socket interface of the r-object.

MH→FH Traffic

RN1 102 will now forward all IP packets received from MH1 116 to the r-object 126. The r-object 126 will, in turn, send these IP packets towards their destination specified in each IP packet header using traditional IP forwarding that is determined by whatever IGP (interior gateway protocol) implemented in the RAN 100. To automate the task of keeping network reachability information accurate, routers within a network may communicate with one another exchanging network reachability data or network routing information from which reachability can be deduced. Interior Gateway Protocol or IGP is a generic term used to refer to any algorithm that routers within an autonomous network use when they exchange routing information.

Figure 2:
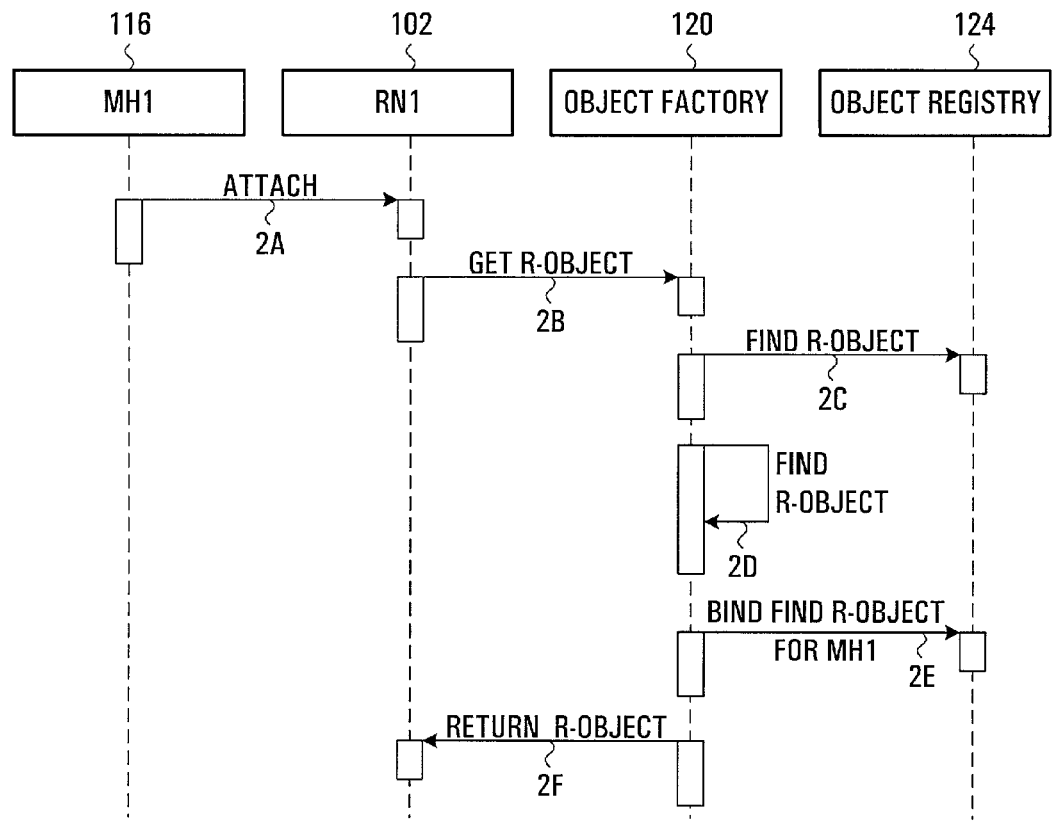
FIG. 2 is a flow control diagram illustrating the flow of control when a mobile host attaches to the network of FIG. 1 for the very first time.

FIG. 2 is a flow control diagram illustrating the flow of control when MH1 116 attaches to the network for the very first time. The mobile host (MH1) 116 begins by establishing a link layer point of attachment with RN1 102 (step 2A). This is done through whatever wireless protocol is expected for communications between mobile hosts and the radio nodes within the radio access network 100. The mobile host MH1 also obtains an IP address through any suitable mechanism. RN1 102 then queries the object factory 120 for MH1's r-object (step 2B). The object factory 120 then attempts to find MH1's r-object using the object registry 124 (step 2C). MH1's r-object is associated with its IP address, and this IP address is used to try to locate the r-object. However, the request fails as MH1 116 is attaching to the network for the first time and an r-object has not previously been assigned. This prompts the object factory 120 to create MH1's r-object 126 (step 2D). The r-object 126 will reside in RN1 102. The object factory 120 then registers the newly created r-object 126 with the object registry 124 (step 2E). Finally, the object factory 120 returns the object reference of the r-object to RN1 102 (step 2F). RN1 then proceeds with initialization of the referenced object as explained above to setup an IP divert mechanism which diverts all packets received from the MH 116 to the raw socket interface of the r-object.

Figure 3:
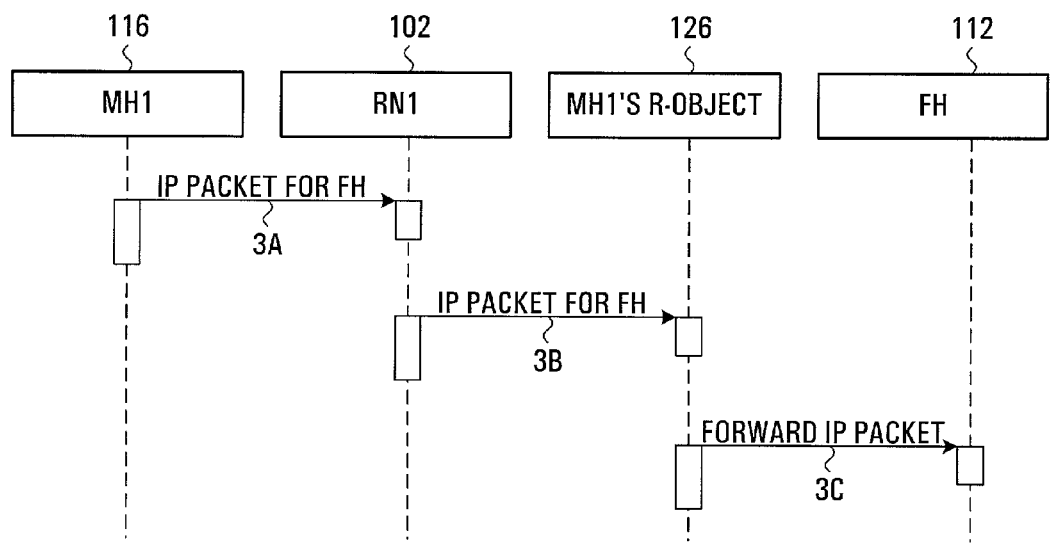
FIG. 3 is a flow control diagram for sending an IP packet from a mobile host to a fixed host using the network of FIG. 1.

After registering with the network as described above, the mobile host (MH1) 116 is then capable of generating IP packet streams. For example, suppose that MH1 116 desires to send IP packets to the fixed host (FH) 112. FIG. 3 provides an example of the flow of control when sending an IP packet from MH1 116 to FH 112. The process begins by MH1 116 sending the IP packet destined for FH 112 to the radio node (RN1) 102 over the air interface (step 3A). The IP divert mechanism in RN1 102 forwards the IP packet received from MH1 116 to MH1's r-object 126 (step 3B). MH1's r-object 126 proceeds by forwarding the IP packet to FH 112 by traditional IP forwarding techniques (step 3C). All upstream traffic needs to pass through MH1's r-object 126 before being forwarded.

FH→MH Traffic

The above description has focused on traffic generated by the MH and sent to the FH. Return traffic processing by the RAN 100 starts when the fixed host (FH) 112 sends a packet for the mobile host (MH1) 116 and the packet reaches the gateway 108. An s-object 130 is created in the gateway 108 to represent FH 112, for example using the object factory 120. The gateway 108 is then configured to forward all IP packets originated from FH 112 to this s-object 130. This requires the establishment of an IP divert or other mechanism within the gateway 108 which identifies packets having the mobile host's IP address and forwards these to the raw socket interface of the s-object. According to the invention, when the s-object 130 receives an IP packet destined for MH1 116, it sends the packet to MH1's r-object 126 using a remote method invocation (RMI) technique to invoke the above referenced "receive IP packet" method on the r-object 126 and by passing the IP packet as a parameter to the remote method invocation. MH1's r-object 126 then sends the IP packet to MH1 116 through the raw socket interface.

Figure 4:
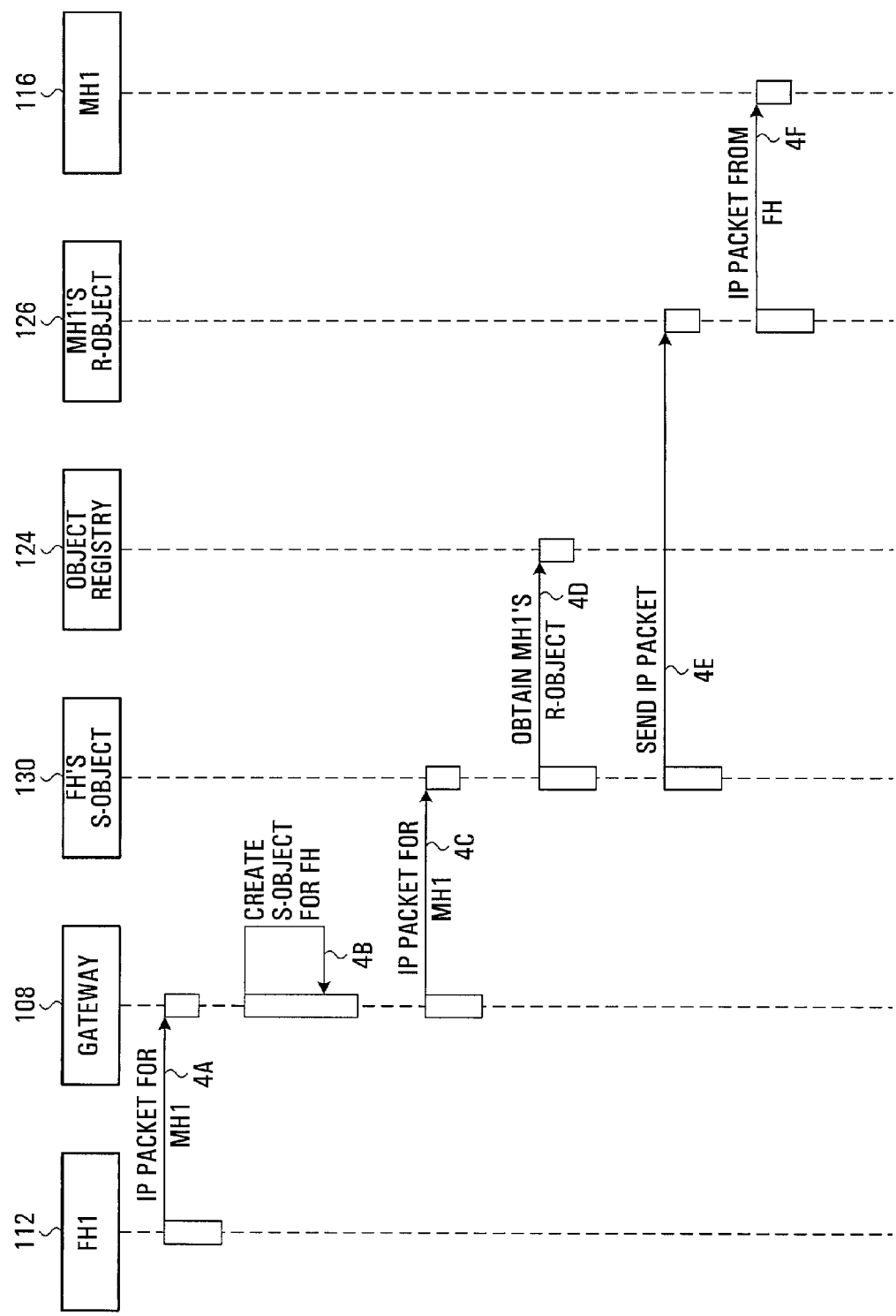
FIG. 4 is a flow control diagram illustrating the flow of control that is implemented when a fixed host sends IP packets to a mobile host using the network of FIG. 1.

FIG. 4 depicts the flow of control that is implemented in accordance with the present invention when the fixed host (FH) 112 sends IP packets to the mobile host (MH1) 116. The process begins by FH 112 sending out an IP packet destined for MH1 116 which gets forwarded to the gateway 108 (step 4A). The gateway 108 creates an s-object 130 for FH 112 (step 4B) and registers the s-object 130 with the object registry 124 (not shown). The gateway 108 needs to check if the s-object already exists within itself. The object registry 124 does not need to be involved in this, as this is just a local check. The gateway 108 forwards the IP packet received from FH 112 to FH's s-object 130 (step 4C). FH's s-object 130 then proceeds to use the object registry 124 to obtain MH1's r-object reference (step 4D). After obtaining MH1's r-object reference from the object registry 124, FH's s-object 130 sends the IP packet to MH1's r-object 126 by invoking a method (the "receive IP packet" method) on it and by passing the IP packet as a parameter (step 4E). MH1's r-object 126 makes this IP packet available to MH1 116 by sending it over the air interface using the raw socket (step 4F). For all subsequent IP packet transmissions, steps 4B and 4D are redundant and, therefore, not needed. The r-object keeps the s-object's reference for use in forwarding subsequent packets.

Mobility Support

The above description has focused on the static delivery of packets to and from a mobile host connected to a RAN. Advantageously, the systems and methods provided by the invention allow for very efficient handling of packets when the mobile host moves and more particularly changes its point of connection to the RAN such as occurs when a handoff from one radio node to another takes place. The mobility support will be described by way of example.

When a mobile host moves, nothing needs to be done to support the continuing delivery of traffic generated by the mobile host to a fixed host. On the other hand, some binding updates need to be performed to support continuing delivery of traffic from the fixed host to the mobile host.

If MH1 116 now moves to a new location, for example enters the coverage area of radio node RN2 104, it is assumed that physical layer connection re-establishment is accomplished using any suitable method. RN2 104 then attempts to obtain an r-object for MH1 116 from the object factory 120. Through the object registry 124, the object factory 120 determines that an r-object already exists for MH1 116. The object factory 120 relocates MH1's existing r-object 126 to the new radio node (RN2) 104 from the previous one and re-registers it with the object registry. In RN2 104, MH1's r-object 126 updates its binding with FH's s-object 130 by supplying the s-object with its new reference. An r-object keeps track of all the r and s-objects it is in conversation with. This information is used for binding updates. If FH 112 now sends an IP packet to the relocated MH1 116, FH's s-object 130 receives it as before. The s-object 130 then sends the IP packet to MH1's r-object 126 in the new radio node RN2 104 using remote method invocation, and the packet then reaches its final destination i.e. MH1 116.

Figure 6:
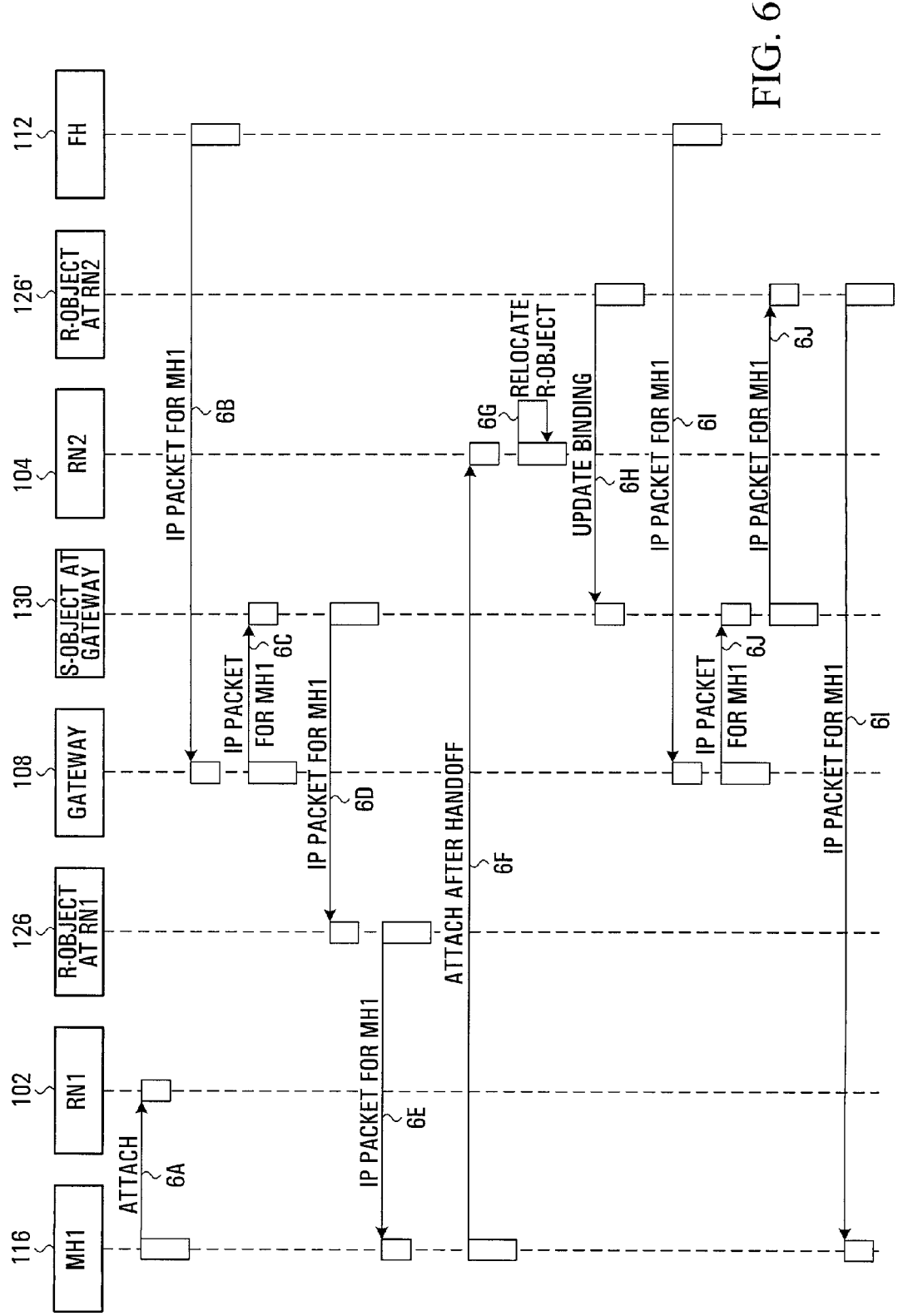
FIG. 6 is a flow control diagram depicting the flow of control implemented when a mobile host performs a handoff between radio nodes while an active TCP or UDP session between the mobile host and a fixed host is in progress, using the network of FIG. 1.

FIG. 6 depicts the flow of control in accordance with the present invention when MH1 116 performs a handoff from RN1 102 to RN2 104 while an active TCP or UDP session between the mobile host MH1 116 and FH 112 is in progress. The process begins with MH1 116 attaching with RN1 102 as described with relation to FIG. 2 (step 6A). Assume the fixed host (FH) 112 sends out an IP packet destined for MH1 116 which arrives at the gateway 108 (step 6B). The gateway 108 forwards the IP packet destined for MH1 116 to FH's s-object 130 (step 6C) assuming that the FH 112 has already created its s-object in the gateway 108. FH's s-object 130 then sends the IP packet to MH1's r-object 126 at RN1 102 by remote method invocation (step 6D). It is assumed here that FH's s-object 130 has already obtained MH1's r-object reference; if this weren't the case, MH1's r-object reference must be retrieved using the object registry. MH1's r-object 126 located at RN1 102 then delivers the IP packet to MH1 116 over the air interface (step 6E). Consider now that MH1 116 moves from the coverage area of RN1 102 to that of RN2 104. MH1 116 attaches with RN2 104 in the same manner as depicted in FIG. 2 (step 6F). RN2 104 then attempts to obtain an r-object corresponding to MH1 116 from the object factory. Using the object registry, the factory discovers that an r-object for MH1 116 already exists. RN2 104 relocates MH1's existing r-object 126 from RN1 102 to itself (step 6g). During relocation, the object registry is also updated so that a new r-object reference for MH1 116 is recorded. This ensures that any new data flow towards MH1 116 gets the updated r-object reference. After being relocated, MH1's r-object 126 at RN2 updates its binding with FH's s-object 130 by providing its current reference (step 6H).

One solution to achieve object relocation is to serialize the object from its old location and then transport it over the wire and reconstitute it in its new location. An alternative way is to create a new object at the new location, obtain all the state information for the object by method calls to the old object, update the new object's state information with the old object's state information and then to destroy the old object.

The next IP packet sent by FH 112 and destined for MH1 116 reaches the gateway 108 (step 6I). The gateway 108 forwards the IP packet to FH's s-object 130 (step 6J). FH's s-object 130 sends the IP packet to the MH1's relocated r-object 126' at RN2 104 by invoking a method on it and passing the IP packet as a parameter (step 6K). MH1's relocated r-object 126' then delivers the IP packet to MH1 116 over the air interface (step 6L).

Multicast Support

In another example, the methods and systems are adapted to provide multicast support. This will be described by way of example. Consider that MH1 116 is running a multicast application and issues a request to join a particular multicast group (typically an IGMP join message). In this embodiment, the r-object representing the mobile host (i.e. MH1's r-object 126) is multicast aware. When MH1's r-object 126 receives the packet, it recognizes that it is a request to join a multicast group. MH1's r-object 126 is configured to change the packet in such a way so that the packet represents that the MH1's r-object per se is joining the multicast group instead of the application running on MH1 116. Subsequently, MH1's r-object 126 redirects all received multicast packets to MH1 116.

If MH1 116 then moves from the coverage area of RN1 102 and attaches with RN2 104, RN2 104 proceeds to try and relocate MH1's r-object 126. Before being relocated, however, MH1's r-object 126 leaves the multicast group (for example by issuing an IGMP leave message). At RN2 104, MH1's relocated r-object 126' joins again with the multicast group using its new IP address. The multicast join and leave functions are transparent to the mobile host (MH1) 116. The mobile host application is connected to the multicast group irrespective of its location.

Figure 7:
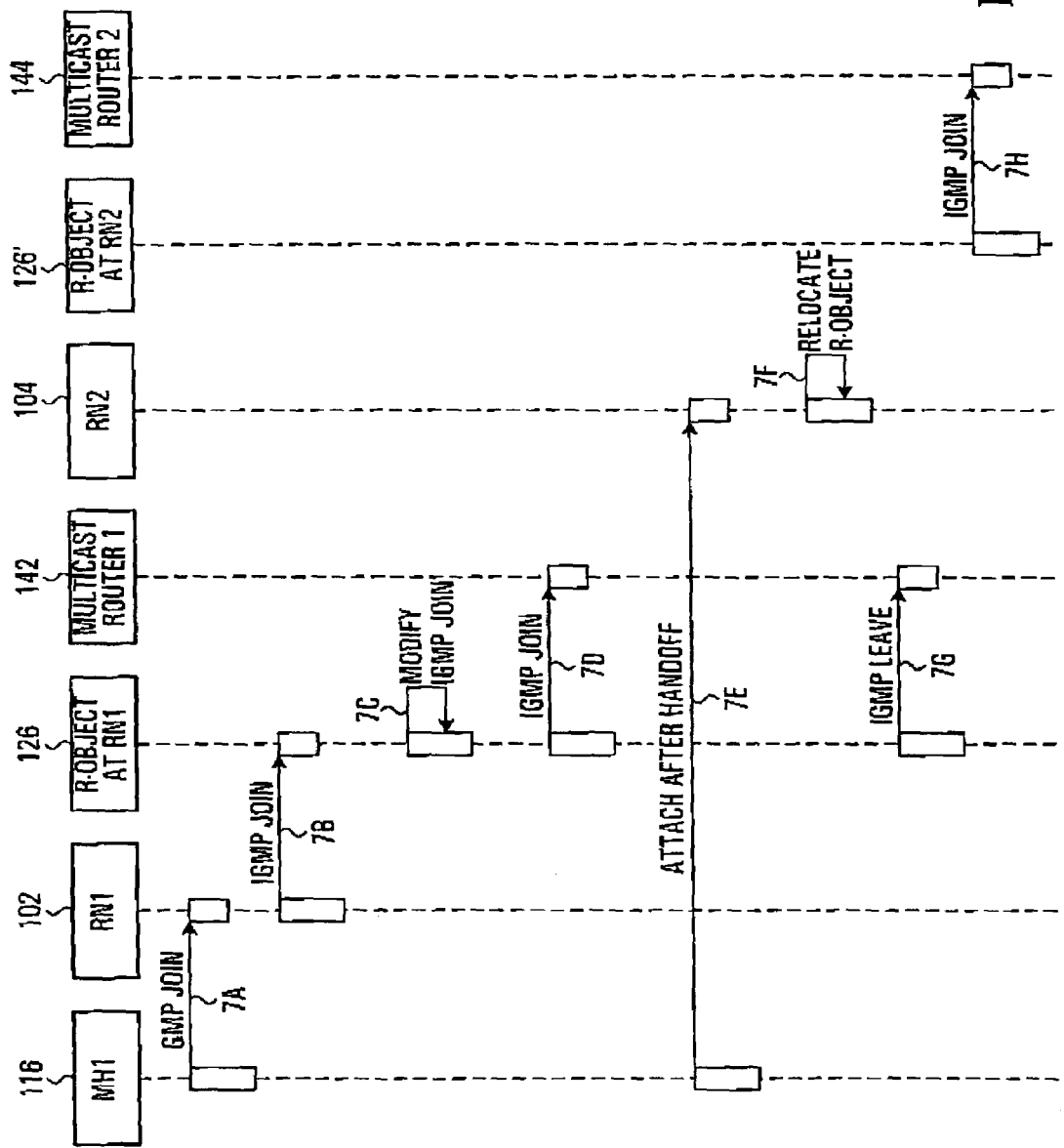
FIG. 7 is a flow control diagram depicting the flow of control implemented when a mobile host performs a handoff between radio nodes during an active multicast session using the network of FIG. 1.

FIG. 7 depicts the flow of control in accordance with the present invention when MH1 116 performs a handoff from RN1 102 to RN2 104 during an active multicast session. As before, it is assumed that MH1 116 has already attached with RN1 102 in accordance with the procedure of FIG. 2, thereby creating an r-object 126 at RN1 102. To join a specific multicast group, then, MH1 116 issues an IGMP join message which is received by RN1 102 (step 7A). RN1 102 forwards this message to MH1's r-object 126 (step 7B). MH1's r-object 126 modifies the IGMP join message by changing the source IP address of request to be the IP address of RN1 (step 7C). MH1's r-object 126 then forwards the modified IGMP join message to the network (step 7D), and in particular to a designated multicast router which is typically designated to handle multicast traffic for a given network. The details of multicast routers are known. How this works is outside the scope of this invention. When a designated multicast router (multicast router 1) 140 receives the modified IGMP join message, it will proceed with normal multicast processing.

Multicast traffic is delivered to the mobile host's r-object using normal multicast routing, not by remote method invocation. The r-object which receives such traffic through its raw socket interface forwards the traffic to the mobile host.

Consider now that MH1 116 leaves the coverage area of RN1 102 and enters the coverage area of RN2 104. As before, MH1 116 attaches with RN2 104 (step 7E). By means of the object factory and object registry (not shown), RN2 104 determines an r-object for MH1 116 already exists at RN1 102. Accordingly, RN2 104 relocates MH1's r-object 126 from RN1 102 to RN2 104 (step 7F). The object factory handles this relocation as mentioned previously However, before being relocated, MH1's r-object 126 at RN1 102 leaves the multicast group by issuing an IGMP leave message (step 7G) to the designated multicast router. After being relocated, MH1's r-object 126' at RN2 104 joins the multicast group again from its new location by issuing another IGMP join message to the network (step 7H). The multicast router designated for the coverage area of RN2 104 receives the IGMP join message and proceeds with normal multicast processing.

RSVP QoS Support

In a final example application, the methods and systems are adapted to provide RSVP QoS support. Consider the case for the mobile host (MH1) 116 performing a handoff during an active QoS session using RSVP (resource reservation setup protocol, see for example http://www.ietf.org/html-.Charters/rSVP-Charter.html) as a resource reservation protocol. Assume that MH1 116 is running an RSVP-aware application and issues RSVP commands to reserve resources in the network for a session with the fixed host (FH) 112. Tn this case, H1's r-object 126 needs to be made RSVP aware. A router is RSVP aware if it has RSVP protocol software running which can identify an RSVP packet and act according to the RSVP protocol specification. When MH1's r-object receives the packet, it recognizes that it is an RSVP packet. Then r-object selects a gateway based on FH address. It obtains the s-object for PH from this gateway. The gateway needs to create the s-object in case it does not have this. H1's r-objcct then sents a modified RSVP packet to FH's s-object 130 at the gateway 108 to set up resources between itself and the FH's s-object 130 in the access network. The IP header of the RSVP packet needs to be modified, to specify the mobile host's s-object location (typically the mobile host's radio access node). When FH's s-object 130 receives the RSVP packet, it sends yet another modified RSVP packet to the host (FH) 112 to reserve resources between itself (i.e. FH's s-object 130) and FH 112, the modified RSVP packet specifying the location of the s-object (typically the gateway node).

Now if the mobile host (MH1) 116 moves from the coverage area of RN1 102 and attaches itself with RN2 104, MH1's r-object 126 tears down the RSVP session between itself and FH's s-object 130 before relocation and sets up the session again from the new location after relocation. The RSVP session tear down and setup functions are transparent to the mobile host (MH1) 116. The application running on the mobile host (MH1) 116 appears to be getting the resources irrespective of the mobile host's location.

FIG. 8 depicts the flow of control in accordance with the present invention when MH1 116 performs a handoff from RN1 102 to RN2 104 during an active RSVP session with FH 112. It is assumed again that MH1 116 has originally attached with RN1 102 in accordance with the procedure of FIG. 2, thereby creating an r-object 126 for MH1 116 at RN1 102.

To initiate an RSVP session, MH1 116 begins by sending out a RSVP PATH message towards the final destination FH 112 which is initially received by RN1 102 (step 8A). RN1 102 forwards this message MH1's r-object 126 (step 8B). MH1's r-object 126 modifies the IP packet containing RSVP PATH message by changing the source IP address of the RSVP PATH message with the IP address of RN1 102 (step 8C). MH1's r-object 126 then forwards the modified RSVP packet towards FH's s-object 130 by using the s-object's IP address and port (step 8D). This, however, is not accomplished using the remote method invocations described earlier since all the routers in the path towards FH's s-object 130 must see the RSVP message. One implication of this is that FH's s-object 130 also acts as a TCP server application. That is, MH1's r-object 126 may obtain the TCP port information by a direct method call on FH's s-object 130. In this case, MH1's r-object 126 could obtain the FH's s-object reference through an object factory (not shown). Upon receiving the modified RSVP PATH message, the gateway 108 delivers the RSVP PATH message to FH's s-object 130 (step 8E). FH's s-object 130 modifies the RSVP PATH message once again and becomes the source of the message before forwarding it on towards FH 112 (step 8f). Standard RESV message flow follows which will not be described in detail. The main point here is that the network is adapted to transparently tear down and set up of RSVP session between an r- and s-object.

While the RSVP session is all set up and running, consider now that MH1 116 performs a handoff and attaches with RN2 104 (step 8G). RN2 104 relocates MH1's r-object 126 from RN1 102 to itself (step 8H). However, before being relocated, MH1's r-object 126 at RN1 sends a PATH TEAR message towards FH's s-object by using its IP address and port (step 8J). Eventually, the PATH TEAR message reaches the gateway 108 whereby it is forwarded to FH's s-object 130 (step 8J). This tears down the RSVP session between MH1's r-object 126 and FH's s-object 130. After being relocated to RN2, MH1's r-object 126' issues a new RSVP PATH message destined to FH's s-object 130 (step 8K). This new RSVP PATH message is forwarded using the s-object's IP address and port just as in step 8D. The RSVP PATH message eventually reaches the gateway 108 whereby it is forwarded to FH's s-object 130 (step 8L). Finally, FH's s-object 130 sets up a new RSVP session (details of which are not shown) between itself and MH1's relocated r-object 126', transparent to both MH1 116 and FH 112.

Mobile-to-Mobile Traffic Support

The above described systems and methods support efficient traffic flow between mobile hosts. Referring back to FIG. 1, consider the case now if MH1 116 wants to send IP packets to another mobile host, MH2 118, for example. When MH1 116 attaches with RN1 102, RN1 102 obtains MH1's r-object 126 as before. Similarly, MH2 118 is in the coverage area of RN2 104 which subsequently obtains MH2's r-object 128 using the technique described above. If MH1 116 sends out an IP packet destined for MH2 118, MH1's r-object 126 will receive the IP packet. Since the destination address belongs to the access network, MH1's r-object 126 tries to obtain MH2's r-object reference through the object registry 124, instead of sending the IP packet directly to the destination IP address. Once MH1's r-object 126 gets MH2's r-object reference, the IP packets are communicated directly between the MH1's r-object 126 and MH2's r-object 128. Advantageously, the packets transmitted between MH1 116 and MH2 118 take an optimal routing path defined by the distributed object framework. This is in contrast to the situation which exists in the event "mobile IP", an existing mobility support technique, is employed in which case the packets must be routed via the home agent of the destination mobile host resulting in a non-optimal routing path. In GPRS, all mobile-to-mobile packets are communicated via a GGSN which again acts as an anchor point resulting in a non-optimal routing path.

Figure 5:
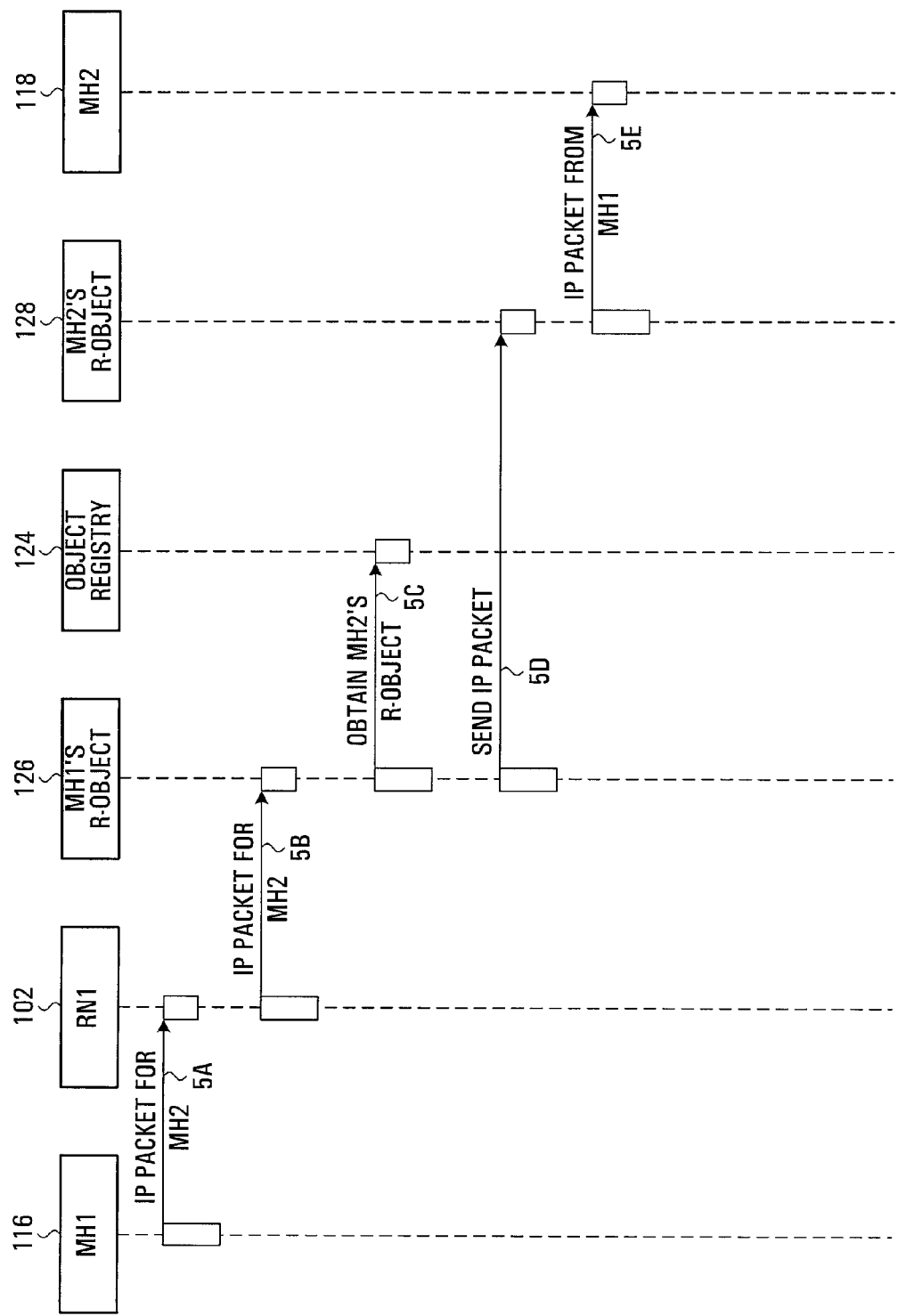
FIG. 5 is a flow control diagram depicting the flow of control implemented when a mobile host sends IP packets to another mobile host using the network of FIG. 1.

FIG. 5 depicts the flow of control in accordance with the present invention when MH1 116 sends IP packets to the MH2 118. It is assumed here that both MH1 116 and MH2 118 have previously registered with the network and that their r-objects have correspondingly been created in their respective radio nodes. The process begins with MH1 116 sending an IP packet destined for MH2 118 to RN1 102 (step 5A). RN1 102 forwards the IP packet to the MH1's r-object 126 (step 5B). Realizing that the destination address of the IP packet belongs to the access network, MH1's r-object 126 obtains MH2's r-object reference from the object registry 124 (step 5C). MH1's r-object 126 then sends the IP packet directly to MH2's r-object 128 by invoking a method on MH2's r-object 128 and passing the IP packet as a parameter (step 5D). Finally, MH2's r-object 128 forwards the IP packet to MH2 118 over the air interface using raw socket (step 5E).

For all subsequent IP packet transmissions, the step of obtaining MH2's r-object reference from the object registry 124 is not needed. This step is only needed if MH1's r-object 126 does not have MH2's r-object reference. In general, r-objects can figure out which addresses belong to the access network and which do not. If a particular destination belongs to the access network, the source r-object tries to obtain the reference of destination r-object; otherwise it simply forwards the IP packet using traditional IP forwarding.

Numerous modifications and variations of the present invention are possible in light of the above teachings. It is therefore to be understood that within the scope of the appended claims, the invention may be practised otherwise than as specifically described herein.

We claim:

1. A network node adapted to forward a data packet to a mobile host connected to a radio node by performing a remote method invocation with the data packet as an argument, the network node being further adapted to be part of a distributed object framework which comprises a set of distributed objects, comprising attributes and methods.

2. A network node according to claim 1 comprising:
   an input for receiving data packets from an external host having a destination address belonging to the mobile host;
   a stationary object comprising attributes and methods associated with the external host belonging to the distributed object framework, the stationary object maintaining an association between tbe destination address of the mobile host and an object reference for a relocatable object comprising attributes and methods associated with the mobile host;
   wherein performing a remote method invocation with the data packet as an argument comprises performing a remote method invocation through the distributed object framework of a method in the relocatable object associated with the mobile host.

3. A network node according to claim 2 further comprising:
   a packet filter adapted to identify data packets having the destination address belonging to the mobile host and to send them to the stationary object associated with the external host.

4. A network node according to claim 3 wherein the data packets are IP packets.

5. A network node according to claim 3 further comprising:
   a plurality of said stationary objects, one for each of a plurality of external hosts; wherein:
   each stationary object has a raw socket interface for receiving and sending packets;
   wherein the packet filter is adapted to identify data packets having any one of a plurality of destination addresses and to send each to a particular stationary object responsible for the particular external host from which the packet was received;
   each stationary object maintains a mapping between each destination address the stationary object is responsible for and a corresponding object reference of a relocatable object associated with one of a plurality of mobile hosts;
   each stationary object upon receiving a data packet having a destination address through its raw socket interface performs a remote method invocation of a method of the relocatable object associated with destination address.

6. A network node according to claim 2 wherein the distributed object framework is an object request broker.

7. A network node according to claim 2 wherein the distributed object framework is one of CORBA, DCOM and JAVA RMI.

8. A network node according to claim 1 which is a gateway node of a radio access network, the gateway node having a backbone connection to another network.

9. A network node according to claim 8 adapted to receive from mobile hosts data packets destined for external hosts on the another network and to forward the data packets through the backbone connection.

10. A network node according to claim 1 further adapted to function as a gateway node in a next-hop routing network.

11. A network node according to claim 1 further adapted to cause to be generate a stationary object in respect of each of a plurality of external hosts with which the network node is in communication.

12. A network node according to claim 1 further adapted to forward all multicast packets to a multicast server.

13. A network node according to claim 1 which is RSVP aware, and which is adapted to establish RSVP sessions over the network.

14. A radio access node adapted to provide data packet service to a mobile host in wireless communication with the radio access node, the radio access node comprising:
   a relocatable object comprising attributes and methods associated with the mobile host belonging to a distributed object framework, the relocatable object having a remotely invokable receive data packet method;
   the radio access node being adapted to receive a data packet from another network node by having the receive data packet method remotely invoked with the data packet as an argument, and adapted to forward the packet to the mobile host.

15. A radio access node according to claim 14 further comprising:
   an input for receiving data packets from the mobile host the data packets having a destination address external to the network;
   wherein, upon receipt of a data packet from the mobile host having a destination address external to the network, the radio access node is adapted to forward the data packet using next-hop forwarding.

16. A radio node according to claim 15 wherein the relocatable object has a raw socket interface through which to receive packets from the mobile host which are then forwarded by the relocatable object using next-hop forwarding.

17. A radio access node according to claim 16 further comprising an IP divert mechanism adapted to forward packets received from the mobile host to the raw socket interface of the relocatable object.

18. A radio access node according to claim 14 further adapted to send the relocatable object to a different radio access node in the event the mobile host performs a handoff to the different radio access node.

19. A radio access node according to claim 14 further adapted to upon initial connection with the mobile host search locally for the relocatable object in association with the mobile host, and if not found locally, to request trough the distributed object framework that the relocatable object be provided from a different radio access node if in existence, and if the relocatable object is not in existence to generate a new relocatable object for the mobile host.

20. A radio access node according to claim 14 adapted to maintain a mapping from object references for relocatable objects to corresponding destination addresses.

21. A radio access node according to claim 14 wherein the relocatable object has an object name which is derived from the IP address of the mobile host.

22. A radio access node according to claim 14 comprising:
   data within or associated with the relocatable object maintaining an association between a destination address of a different mobile host and an object reference for another relocatable object associated with the different mobile host;
   the radio access node being adapted to receive packets from the mobile host having a destination address belonging to the different mobile host and to forward the packet to the different mobile host by performing a remote method invocation with the data packet as an argument of a method in the another relocatable object associated with the mobile host.

23. A radio access node according to claim 22 further comprising:
   for each another relocatable object with which packets are exchanged, a mapping from a destination address of packets destined to a location associated with the another relocatable object to an object reference for the another relocatable object, the object reference allowing remote method invocation on the another relocatable object.

24. A radio access node according to claim 23 wherein:
   the relocatable object is adapted to behave as a proxy for the mobile host for RSVP communications.

25. A radio node according to claim 24 wherein the relocatable object intercepts RSVP messages, modifies them to specify a location of the relocatable object rather than the address of the mobile host, before forwarding than, and wherein the relocatable object receives RSVP traffic on behalf of the mobile host and forwards the RSVP traffic to the mobile host.

26. A radio node according to claim 25 wherein, upon the relocatable object's relocation at a different access node, the relocatable object is adapted to tear down an existing RSVP connection, and establish a new RSVP connection from its new location, all transparently to the mobile host.

27. A radio access node according to claim 14 wherein:
   the relocatable object is adapted to behave as a proxy for the mobile host for multicast communications.

28. A radio node according to claim 27 wherein, upon the relocatable object's relocation at a different access node, the relocatable object is adapted to leave the multicast group, and then rejoin from its new location, all transparently to the mobile host.

29. A radio access node adapted to provide data packet service to a mobile host in wireless communication with the radio access node, the radio access node comprising:
   a relocatable object associated with the mobile host belonging to a distributed object framework, the relocatable object having a remotely invokable receive data packet method;
   the radio access node being adapted to receive a data packet from another network node by having the receive data packet method remotely invoked with the data packet as an argument, and adapted to forward the packet to the mobile host wherein the relocatable object is adapted to behave as a proxy for the mobile host for multicast communications; and
   wherein the relocatable object intercepts multicast join messages, modifies them to specify a location of the relocatable object rather than the address of the mobile host, before forwarding them, and wherein the relocatable object receives multicast traffic on behalf of the mobile host and forwards the multicast traffic to the mobile host.

30. A radio access network adapted to provide wireless data packet services to a plurality of mobile hosts each having a network address, the radio access network comprising:

a gateway node through which connections to external hosts may be established, the gateway node being adapted to forward incoming data packets specifying destination address to a corresponding stationary object associated with each external host;

a plurality of radio nodes;

a network of data packet routers interconnecting the radio nodes and the gateway node and adapted to perform next-hop forwarding;

a distributed object framework through which methods on objects comprising attributes and methods located on the different network nodes are remotely invoked;

for each mobile host connected to the radio access network, a respective relocatable object, each relocatable object having a respective receive packet method which is remotely invokable through the distributed object framework;

for each externally located host connected to the radio access network trough the gateway node, a respective stationary object;

wherein data packets arriving from an external host at the gateway specifying a destination address which is the network address of a particular mobile host are forwarded to the stationary object associated with the external host which then forwards the packet to the relocatable object associated with the destination address using a remote method invocation.

31. A radio access network according to claim 30 further adapted to perform normal next-hop forwarding of packets destined for external nodes which are received from mobile hosts by radio nodes.

32. A radio access network according to claim 30 wherein the distributed object framework is an object request broker framework.

33. A radio access network according to claim 30 wherein the packet data network is an all IP network.

34. A method for a network node to forward a data packet to mobile hosts comprising:

maintaining a respective stationary object comprising attributes and methods associated with each of a plurality of external hosts, the stationary objects belonging to a distributed object framework, each stationary object maintaining an association between a respective destination adresses of each mobile host with which the associated external host is in communication, and an object reference of a relocatable object comprising attributes and methods associated with each such mobile host;

receiving data packets from a particular external host having a destination address belonging to a particular mobile host and passing such data packets to the stationary object associated with the particular external host;

the stationary object associated with the particular external host performing a remote method invocation with the data packet as an argument through the distributed object framework of a method in the relocatable object associated with the particular mobile host.

35. A method according to claim 34 wherein the data packets are IP packets.

36. A method according to claim 34 wherein passing data packets received from a particular external host to the stationary object associated with the particular external host comprises forwarding the packets to the stationary object through a raw socket interface of the stationary object.

37. A method according to claim 34 wherein the distributed object framework is an object request broker.

38. A method according to claim 34 wherein the distributed object framework is one of CORBA, DCOM and JAVA RMI.

39. A method for a radio access node to provide data packet service to a mobile host in wireless communication with the radio access node, the method comprising:

defining a relocatable object comprising attributes and methods associated with the mobile host belonging to a distributed object framework, the relocatable object having a remotely invokable receive data packet method;

the relocatable object receiving a data packet from another network node by having the receive data packet method remotely invoked with the data packet as an argument;

the relocatable object forwarding the data packet to the mobile host.

40. A method according to claim 39 further comprising:

the radio node receiving data packets from the mobile host, data packets having a destination address external to an access network to which the radio node belongs and passing these to the relocatable object;

the relocatable object forwarding the data packets using next-hop forwarding.

41. A method according to claim 39 further comprising:

sending the relocatable object to a different radio access node in the event the mobile host moves so as to be in communication with the different radio access node.

42. A method according to claim 39 further comprising, upon initial connection with the mobile host:

searching locally for the relocatable object in association with the mobile host, and if not found locally, to requesting through the distributed object framework that the relocatable object be provided from a different radio access node if in existence, and if the relocatable object is not in existence requesting the generation of a new relocatable object for the mobile host.

43. A method according to claim 39 further comprising:

upon receipt of packets from the mobile host which specify a destination address of another mobile host connected to the same network as the radio node, forwarding the packets to a relocatable object associated with the another mobile host through a remote method invocation.

44. A method according to claim 39 further comprising:

the relocatable object behaving as a proxy for the mobile host for multicast communications.

45. A method according to claim 39 further comprising:

the relocatable object behaving as a proxy for the mobile host for RSVP communications.

46. A method according to claim 45 further comprising:

the relocatable object intercepting RSVP messages, modifying the RSVP messages to specify a location of the relocatable object rather than an address of the mobile host, before forwarding RSVP messages, and the relocatable object receiving RSVP traffic on behalf of the mobile host and forwarding the RSVP traffic to the mobile host.

47. A method according to claim 46 further comprising:

upon the relocatable object's relocation at a different access node, the relocatable object initiating a tear down of an existing RSVP connection, and initiating establishment of a new RSVP connection from its new location, all transparently to the mobile host.

48. A method for a radio access node to provide data packet service to a mobile host in wireless communication with the radio acccss node, the method comprising:

defining a relocatable object associated with the mobile host belonging to a distributed object framework, the relocatable object having a remotely invokable receive data packet method;

the relocatable object receiving a data packet from another network node by having the receive data packet method remotely invoked with the data packet as an argument;

the relocatable object forwarding the data packet to the mobile host;

the method further comprising the relocatable object behaving as a proxy for the mobile host for multicast communications;

the method further comprising: intercepting multicast join messages, modifying multicast join messages to specify a location of the relocatable object rather than an address of the mobile host, before forwarding multicast messages, and the relocatable object receiving multicast traffic on behalf of the mobile host and forwarding the mulicast traffic to the mobile host.

49. A method according to claim 48 further comprising, upon the relocatable abject's relocation at a different access node, the relocatable abject leaving the multicast group, and then rejoining the multicast group from its new location, all transparently to the mobile host.

* * * * *

UNITED STATES PATENT AND TRADEMARK OFFICE
CERTIFICATE OF CORRECTION

PATENT NO.       : 7,082,116 B2
APPLICATION NO.  : 09/749423
DATED            : July 25, 2006
INVENTOR(S)      : Ahmed Areef Reza et al.

It is certified that error appears in the above-identified patent and that said Letters Patent is hereby corrected as shown below:

Column 15, line 54, claim 19, "...trough..." should be --...through...--;
Column 16, line 26, claim 25, "...forwarding than..." should be --...forwarding them...--;
Column 17, line 19, claim 30, "...trough..." should be --...through...--;
Column 18, line 67, claim 48, "...radio acccss..." should be --...radio access...--;
Column 20, line 9, claim 49, "...abject's..." should be --...object's...--;
Column 20, line 10, claim 49, "...abject..." should be --...object...--.

Signed and Sealed this

Sixth Day of February, 2007

JON W. DUDAS
*Director of the United States Patent and Trademark Office*